US012760661B2

(12) United States Patent
Kawamitsu et al.

(10) Patent No.: US 12,760,661 B2
(45) Date of Patent: Oct. 13, 2026

(54) TURBOCHARGER

(71) Applicant: IHI Corporation, Tokyo (JP)

(72) Inventors: Kenta Kawamitsu, Tokyo (JP); Kotomichi Kitajima, Tokyo (JP); Xianpeng Ren, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 19/071,844

(22) Filed: Mar. 6, 2025

(65) Prior Publication Data

US 2025/0198301 A1 Jun. 19, 2025

Related U.S. Application Data

(63) Continuation of application No. PCT/JP2023/023112, filed on Jun. 22, 2023.

(30) Foreign Application Priority Data

Nov. 16, 2022 (JP) ................................ 2022-183720

(51) Int. Cl.
*F01D 25/08* (2006.01)

(52) U.S. Cl.
CPC .......... *F01D 25/08* (2013.01); *F05D 2220/40* (2013.01); *F05D 2260/231* (2013.01)

(58) Field of Classification Search
CPC ..... F01D 25/08; F01D 25/145; F05D 2220/40
See application file for complete search history.

(56) References Cited

U.S. PATENT DOCUMENTS

| | | | | |
|---|---|---|---|---|
| 10,947,860 | B2 * | 3/2021 | Kurata | F02B 37/186 |
| 2019/0234229 | A1 | 8/2019 | Kurata | |

FOREIGN PATENT DOCUMENTS

| | | | |
|---|---|---|---|
| JP | 2004-106652 | A | 4/2004 |
| JP | 2005-171792 | A | 6/2005 |
| JP | 2008-25442 | A | 2/2008 |
| JP | 2013-100773 | A | 5/2013 |
| JP | 2016-89333 | A | 5/2016 |
| WO | WO 2008/096515 | A1 | 8/2008 |
| WO | WO 2017/142038 | A1 | 8/2017 |
| WO | WO 2018/207624 | A1 | 11/2018 |

OTHER PUBLICATIONS

International Search Report issued Aug. 1, 2023 in PCT/JP2023/023112 filed on Jun. 22, 2023, 2 pages.

* cited by examiner

*Primary Examiner* — Ibrahime A Abraham
*Assistant Examiner* — John S Hunter, Jr.
(74) *Attorney, Agent, or Firm* — Oblon, McClelland, Maier & Neustadt, L.L.P.

(57) ABSTRACT

Provided is a turbocharger including a target component and a heat-shielding cover provided between the target component and a heat source. The heat-shielding cover includes at least one cover member that defines a heat-shielding space around the target component. A thickness of at least one heat-shieling space becomes maximum at a position on the heat source side with respect to the target component.

18 Claims, 6 Drawing Sheets

TURBOCHARGER

CROSS REFERENCE TO RELATED APPLICATIONS

This application is a continuation application of International Application No. PCT/JP2023/023112, filed on Jun. 22, 2023, which claims priority to Japanese Patent Application No. 2022-183720, filed on Nov. 16, 2022, the entire contents of which are incorporated by reference herein.

BACKGROUND ART

Technical Field

The present disclosure relates to a turbocharger. This application claims the benefit of priority to Japanese Patent Application No. 2022-183720 filed on Nov. 16, 2022 and contents thereof are incorporated herein.

Related Art

In some turbochargers, an electric actuator such as a motor is used to drive a movable member. For example, in Patent Literature 1, there is disclosed a turbocharger including a motor for turning variable nozzle vanes that are used to adjust a flow velocity of gas to be sent to a turbine wheel.

CITATION LIST

Patent Literature

Patent Literature 1: WO 2018/207624 A1

SUMMARY

Technical Problem

In the turbocharger, components such as the electric actuator are heated due to heat from a heat source. Thus, it is appropriate that components such as the electric actuator be protected from the heat from the heat source.

An object of the present disclosure is to provide a turbocharger capable of protecting components of the turbocharger from heat.

Solution to Problem

In order to solve the problem described above, according to the present disclosure, there is provided a turbocharger, including: a target component; and a heat-shielding cover, which is provided between the target component and a heat source, and includes at least one cover member that defines a heat-shielding space around the target component, at least one heat-shielding space having a thickness becoming maximum at a position on the heat source side with respect to the target component.

The cover member may include: a first cover member covering an outer surface of the target component; and a second cover member covering an outer surface of the first cover member, and the heat-shielding space may include: a first heat-shielding space defined between the outer surface of the target component and an inner surface of the first cover member; and a second heat-shielding space defined between an outer surface of the first cover member and an inner surface of the second cover member.

A thickness of the first heat-shielding space may become maximum at the position on the heat source side with respect to the target component.

A thickness of the second heat-shielding space may become maximum at the position on the heat source side with respect to the target component.

The first cover member and the second cover member may be fixed to each other.

The heat-shielding space may be formed so as to penetrate in a vertical direction.

Effects

According to the present disclosure, components of the turbocharger can be protected from heat.

DESCRIPTION OF EMBODIMENTS

Figure 1:
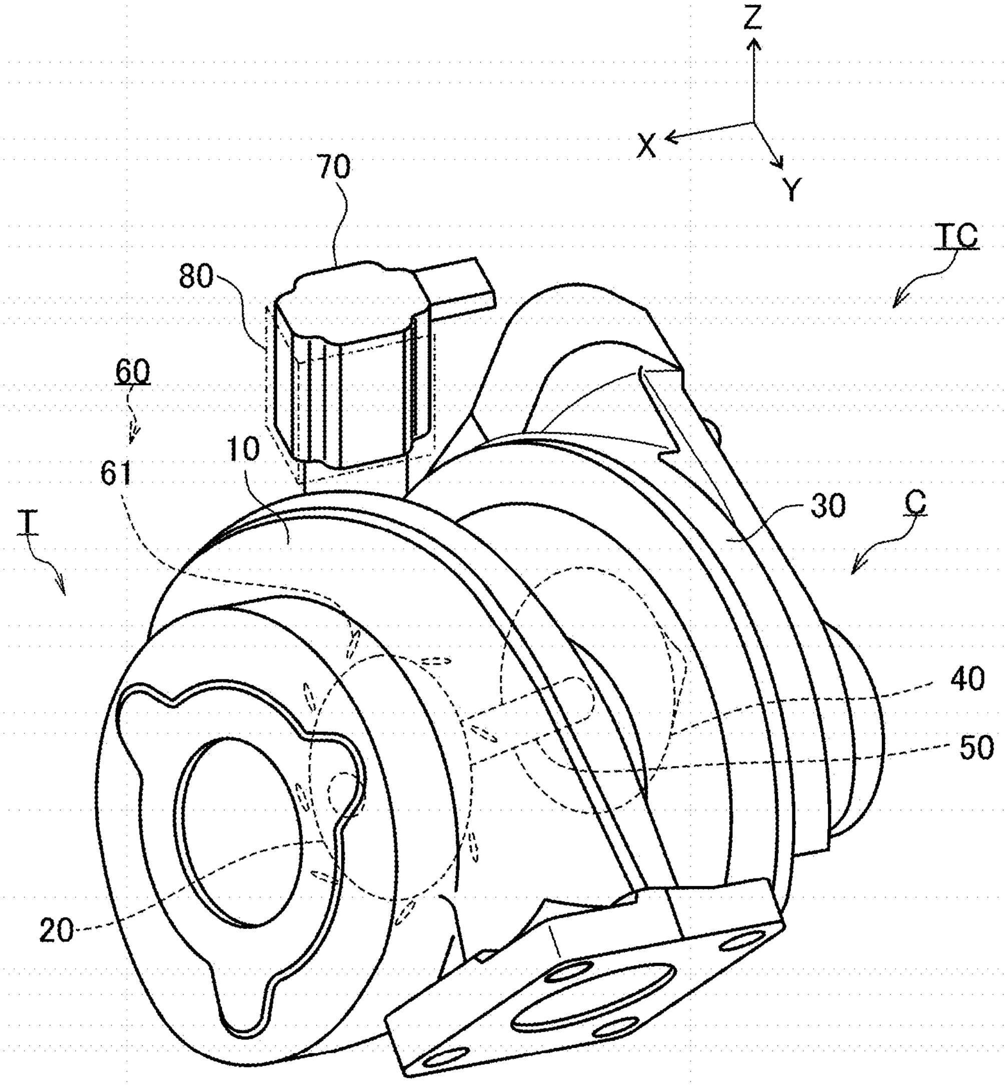
FIG. 1 is a perspective view for illustrating a turbocharger according to an embodiment of the present disclosure.

Now, with reference to the attached drawings, an embodiment of the present disclosure is described. The dimensions, materials, other specific numerical values, and the like represented in the embodiment are merely examples used for facilitating the understanding of the disclosure, and do not limit the present disclosure unless otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a perspective view for illustrating a turbocharger TC according to this embodiment. FIG. 1 and FIG. 2 to FIG. 6 referred to later show a Z axis directed vertically upward and an X axis and a Y axis that are directed in a horizontal direction and are orthogonal to each other.

As illustrated in FIG. 1, the turbocharger TC includes a turbine T and a centrifugal compressor C. The turbine T includes a turbine housing 10. A turbine wheel 20 is rotatably housed in the turbine housing 10. The centrifugal compressor C includes a compressor housing 30. A compressor impeller 40 is rotatably housed in the compressor housing 30. The turbine housing 10 and the compressor housing 30 are arranged in an X-axis direction. The turbine housing 10 and the compressor housing 30, each having a substantially cylindrical shape, are arranged coaxially. A center axis of the turbine housing 10 and the compressor housing 30 is parallel to the X axis.

The turbine wheel 20 and the compressor impeller 40 are connected to each other through intermediation of a shaft 50 that is rotatably supported by bearings in a pivotable manner. The turbine wheel 20, the compressor impeller 40, and the shaft 50 rotate integrally.

The turbocharger TC is connected to an engine. An exhaust gas discharged from the engine flows into the turbine housing 10 and rotates the turbine wheel 20. After that, the exhaust gas flows out to an outside of the turbine housing 10. A rotational force of the turbine wheel 20 is transmitted to the compressor impeller 40 via the shaft 50. Rotation of the compressor impeller 40 causes outside air to be sucked into the compressor housing 30. The sucked air is compressed and is supplied to an air intake port of the engine.

The turbine T is a variable displacement turbine. An adjustment mechanism 60 for adjusting a flow velocity of the exhaust gas to be sent to the turbine wheel 20 is provided in the turbine housing 10. The adjustment mechanism 60 includes a plurality of variable nozzle vanes 61 capable of adjusting a flow passage sectional area of a flow passage on an upstream side of the turbine wheel 20. The plurality of variable nozzle vanes 61 are arranged on a radially outer side with respect to the turbine wheel 20. The plurality of variable nozzle vanes 61 are arranged at intervals in a circumferential direction of the turbine wheel 20. Turning of the variable nozzle vanes 61 changes the flow passage sectional area in accordance with a turning angle of the variable nozzle vanes 61. As a drive source for driving such an adjustment mechanism 60, a motor 70 is provided outside the turbine housing 10 and the compressor housing 30.

The motor 70 has a substantially quadrangular prism shape. In the X-axis direction, the motor 70 is arranged between the turbine housing 10 and the compressor housing 30. The motor 70 is positioned vertically above the turbine housing 10 and the compressor housing 30, and extends in a vertical direction.

An output shaft of the motor 70 is coupled to the adjustment mechanism 60 provided in the turbine housing 10 through intermediation of various members such as a link member. A driving force output from the motor 70 turns the variable nozzle vanes 61 of the adjustment mechanism 60 to thereby change the flow passage sectional area. As a result, the flow velocity of the exhaust gas to be sent to the turbine wheel 20 is changed.

A heat-shielding cover 80 is provided between the motor 70 and a heat source so as to protect the motor 70 from heat from the heat source. In FIG. 1, the heat-shielding cover 80 is illustrated in a simplified manner and is indicated by two-dot chain lines. Examples of the heat source include a specific portion of the turbine housing 10. However, the heat source is not limited to the turbine housing 10. For example, the heat source may include an exhaust manifold of the engine. Description is given below of an example in which a target component to be protected by the heat-shielding cover 80 is the motor 70. However, the target component may be a component other than the motor 70.

Figure 2:
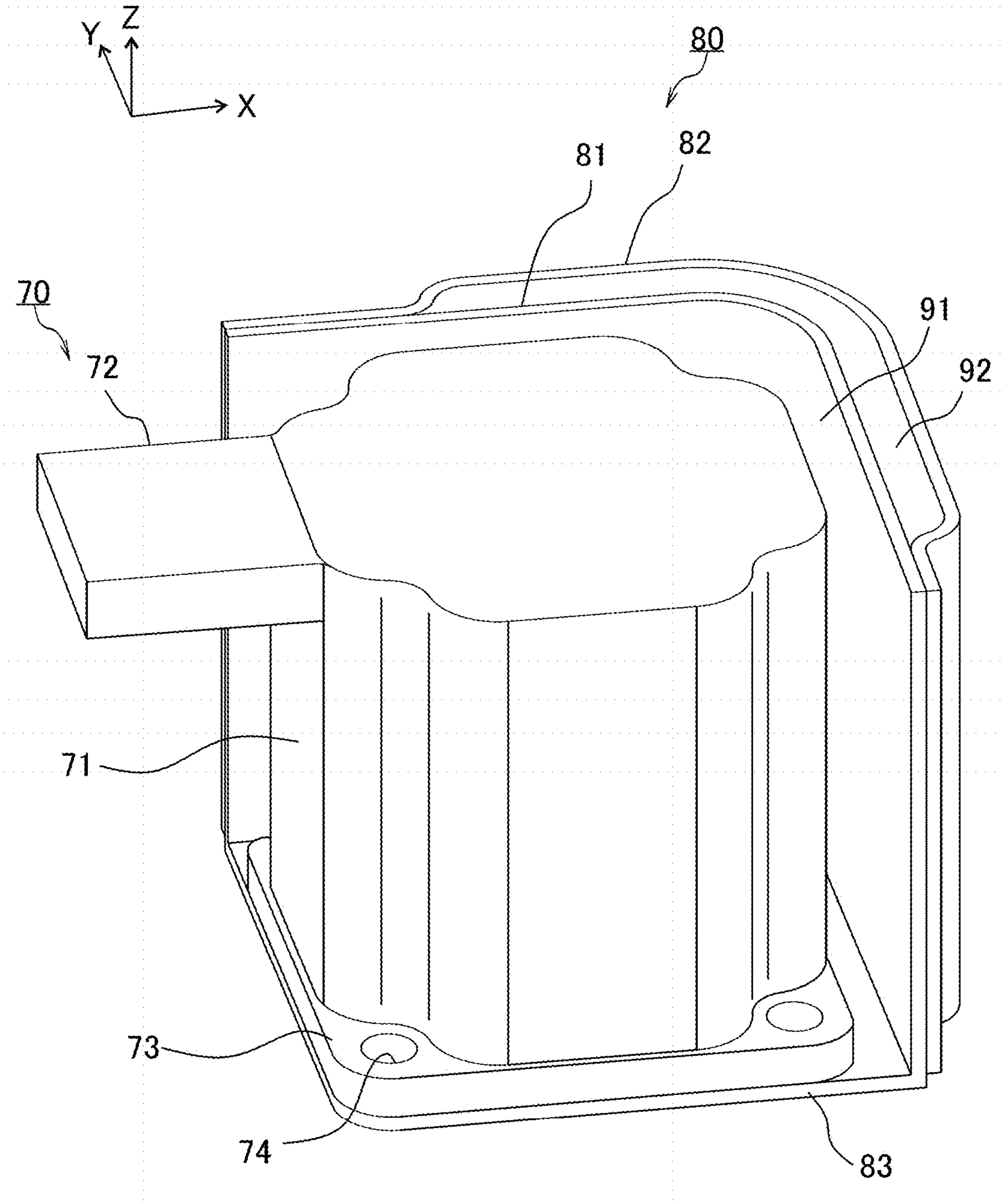
FIG. 2 is a perspective view for illustrating a motor and a heat-shielding cover in the embodiment of the present disclosure.
Figure 3:
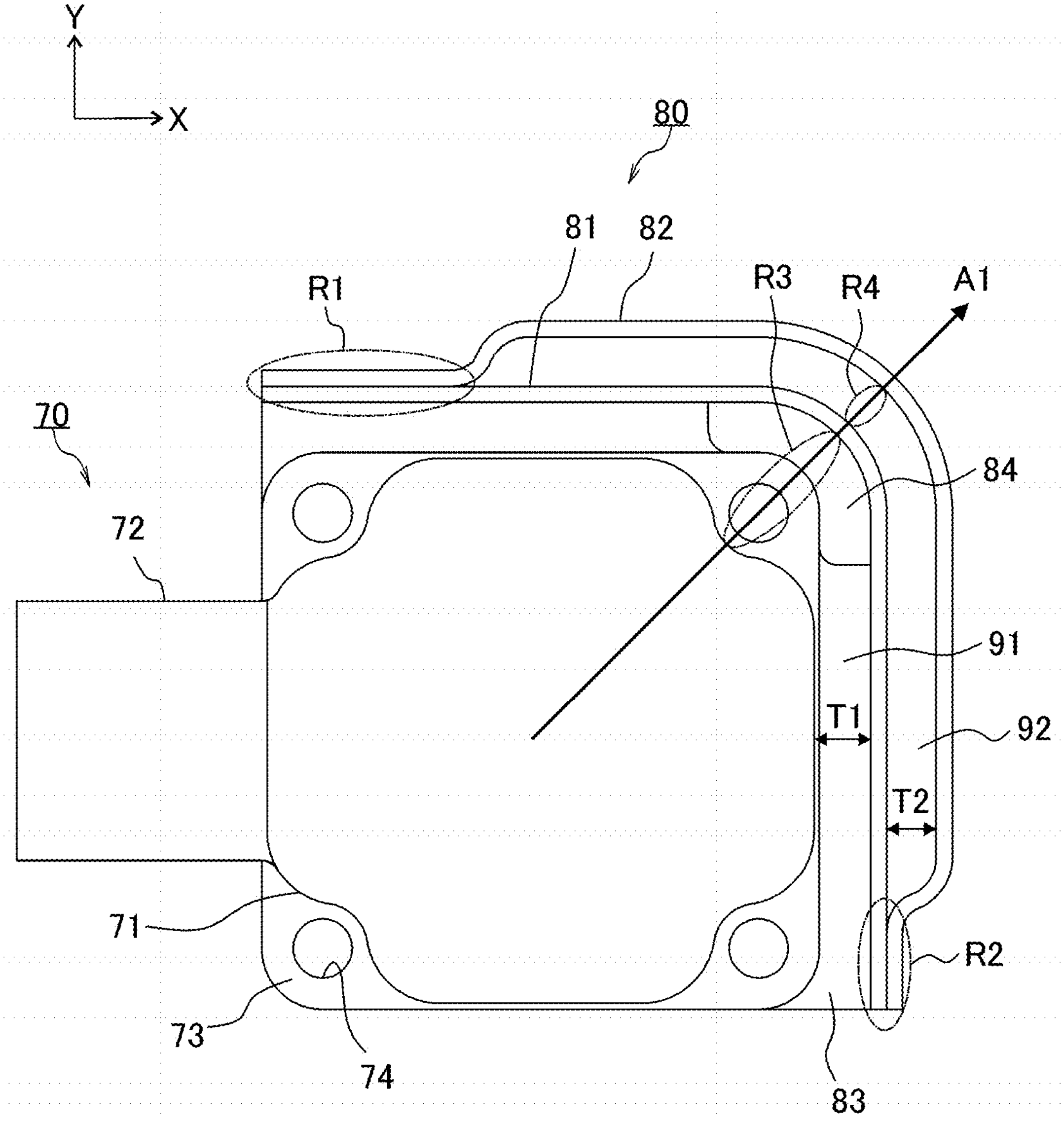
FIG. 3 is a top view for illustrating the motor and the heat-shielding cover in the embodiment of the present disclosure.

Now, details of the heat-shielding cover 80 are described with reference to FIG. 2 and FIG. 3. FIG. 2 is a perspective view for illustrating the motor 70 and the heat-shielding cover 80 in this embodiment. FIG. 3 is a top view for illustrating the motor 70 and the heat-shielding cover 80 in this embodiment.

As illustrated in FIG. 2 and FIG. 3, the motor 70 includes a main body 71, a connector part 72, and a base part 73. The main body 71 has a substantially quadrangular prism shape. A stator and a rotor are built inside the main body 71. The main body 71 extends in the vertical direction (that is, a Z-axis direction). A shape of a cross section of the main body 71 taken in a horizontal direction (that is, a cross section parallel to an XY plane) is a square with indented corners. The connector part 72 extends in the X-axis direction from an upper part of an outer peripheral surface of the main body 71. A cable to be connected to a control device or the like is to be attached to the connector part 72. The base part 73 protrudes outward in a radial direction of the main body 71 from a lower part of the main body 71. The base part 73 has a substantially rectangular flat plate shape. A bolt hole 74 through which a bolt is to be inserted is formed in each of corners of the base part 73.

A circumferential direction of the motor 70 and a radial direction of the motor 70 are hereinafter also referred to simply as "circumferential direction" and "radial direction." The circumferential direction of the motor 70 corresponds to a circumferential direction of the main body 71 about a center axis extending in the vertical direction. The radial direction of the motor 70 corresponds to the radial direction of the main body 71 about the center axis extending in the vertical direction.

The heat-shielding cover 80 includes a first cover member 81 and a second cover member 82. As described later, the first cover member 81 and the second cover member 82 define a first heat-shielding space 91 and a second heat-shielding space 92 around the motor 70 as a heat-shielding space. The heat-shielding space is a space for shielding heat that may be transferred to the motor 70.

The first cover member 81 covers a part of an outer peripheral surface of the motor 70. In the example of FIG. 2 and FIG. 3, the first cover member 81 covers a surface on a positive-direction side of the X axis and a surface on a positive-direction side of the Y axis, which are included in the outer peripheral surface of the main body 71 of the motor 70. The first cover member 81 is spaced apart from the outer peripheral surface of the motor 70 in the radial direction of the motor 70, and extends in the circumferential direction. As illustrated in FIG. 3, when viewed from above, the first cover member 81 is curved in a center in the circumferential direction (that is, on an upper right side in FIG. 3) and linearly extends in a negative direction of the X axis and a negative direction of the Y axis from the curved portion.

Further, the first cover member 81 extends in the vertical direction. A length of the first cover member 81 in the vertical direction is substantially equal to a length of the motor 70 in the vertical direction. A position of an upper end of the first cover member 81 in the vertical direction is substantially the same as a position of an upper end of the motor 70 in the vertical direction. A position of a lower end of the first cover member 81 in the vertical direction is substantially the same as a position of a lower end of the motor 70 in the vertical direction.

A mounting member 83 is connected to a lower part of the first cover member 81. In the example of FIG. 2 and FIG. 3, the first cover member 81 and the mounting member 83 are molded integrally with each other. However, the first cover member 81 and the mounting member 83 may be formed as separate bodies. The mounting member 83 is a member that allows the first cover member 81 to be mounted to the motor 70. The mounting member 83 extends from the lower part of the first cover member 81 in the horizontal direction toward the motor 70. The mounting member 83 is formed in a substantially rectangular flat plate shape. A lower surface of the base part 73 of the motor 70 is superposed on an upper surface of the mounting member 83. Through holes are formed in the mounting member 83 at positions facing the bolt holes 74. The mounting member 83 is mounted to the motor 70 with use of bolts (not shown) that are inserted through the bolt holes 74 and the through holes.

The second cover member 82 covers an outer surface of the first cover member 81. A surface of the first cover member 81 on the motor 70 side is an inner surface of the first cover member 81, and a surface of the first cover member 81 on a side opposite to the motor 70 is an outer surface of the first cover member 81. The second cover member 82 extends in the circumferential direction. In the circumferential direction, a range in which the first cover member 81 is present and a range in which the second cover member 82 is present are substantially the same.

As illustrated in FIG. 3, the first cover member 81 and the second cover member 82 are fixed to each other in a region R1 on one end side and a region R2 on another end side in the circumferential direction of the motor 70. The first cover member 81 and the second cover member 82 are fixed to each other, for example, by welding. However, the first cover member 81 and the second cover member 82 may be fixed to each other by a method other than welding, such as caulking or bolt tightening. The second cover member 82 is spaced apart from the outer surface of the first cover member 81 in the radial direction in a region other than the region R1 and the region R2 in the circumferential direction. As illustrated in FIG. 3, when viewed from above, the second cover member 82 is curved in a center in the circumferential direction (that is, on the upper right side in FIG. 3), and linearly extends from the curved portion in the negative direction of the X-axis and the negative direction of the Y-axis.

Further, the second cover member 82 extends in the vertical direction. A length of the second cover member 82 in the vertical direction is substantially equal to the length of the first cover member 81 in the vertical direction. A position of an upper end of the second cover member 82 in the vertical direction is substantially the same as the position of the upper end of the first cover member 81 in the vertical direction. A position of a lower end of the second cover member 82 in the vertical direction is substantially the same as the position of the lower end of the first cover member 81 in the vertical direction.

The first heat-shielding space 91 is defined between an outer surface of the motor 70 and the inner surface of the first cover member 81. In the example of FIG. 2 and FIG. 3, the first heat-shielding space 91 is defined between the first cover member 81 and the surface on the positive direction side of the X axis and the surface on the positive direction side of the Y axis, which are included in the outer peripheral surface of the main body 71 of the motor 70. The first heat-shielding space 91 extends in the vertical direction and the circumferential direction. Side surfaces of the first heat-shielding space 91 are defined by the first cover member 81 and the outer peripheral surface of the motor 70. An upper surface of the first heat-shielding space 91 is opened. A bottom surface of the first heat-shielding space 91 is defined by the mounting member 83. As illustrated in FIG. 3, an opening 84 is formed in the mounting member 83. The opening 84 is formed in a center of a part of the mounting member 83 in the circumferential direction, which is in contact with the first heat-shielding space 91. The first heat-shielding space 91 is in communication with a space vertically below the mounting member 83 via the opening 84. Thus, the first heat-shielding space 91 is formed so as to penetrate in the vertical direction.

The second heat-shielding space 92 is defined between the outer surface of the first cover member 81 and an inner surface of the second cover member 82. A surface of the second cover member 82 on the first cover member 81 side is the inner surface of the second cover member 82, and a surface of the second cover member 82 on a side opposite to the first cover member 81 is an outer surface of the second cover member 82. In the example of FIG. 2 and FIG. 3, the second heat-shielding space 92 is defined between the first cover member 81 and the second cover member 82 in the region other than the region R1 and the region R2 in the circumferential direction. The second heat-shielding space 92 extends in the vertical direction and the circumferential direction. Side surfaces of the second heat-shielding space 92 are defined by the first cover member 81 and the second cover member 82. An upper surface and a bottom surface of the first heat-shielding space 92 are opened. Thus, the second heat-shielding space 92 is formed so as to penetrate in the vertical direction.

In FIG. 3, a direction toward the light source from the motor 70 is indicated by an arrow A1. In the example of FIG. 3, when viewed from above, the arrow A1 is directed in a direction that bisects an angle formed between the X axis and the Y axis. In other words, the arrow A1 is directed in a direction of a composite vector of a unit vector in the positive direction of the X axis and a unit vector in the positive direction of the Y axis.

A thickness T1 of the first heat-shielding space 91 becomes maximum at a position on the heat source side with respect to the motor 70. The thickness T1 corresponds to a distance between the outer peripheral surface of the main body 71 of the motor 70 and the inner surface of the first cover member 81. In FIG. 3, the position in the first heat-shielding space 91 on the heat source side with respect to the motor 70 is illustrated as a region R3. The thickness T1 at this position is larger than the thickness T1 at positions therearound.

Meanwhile, a thickness T2 of the second heat-shielding space 92 is constant at all positions in the circumferential direction. The thickness T2 corresponds to a distance between the outer surface of the first cover member 81 and the inner surface of the second cover member 82. In FIG. 3, a position in the second heat-shielding space 92 on the heat source side with respect to the motor 70 is illustrated as a region R4. The thickness T2 at this position is equal to the thickness T2 at other positions.

As described above, in the turbocharger TC, the thickness T1 of the first heat-shielding space 91 becomes maximum at the position on the heat source side with respect to the motor 70. In this manner, a layer of air having a low thermal conductivity can be made thick at the position in the first heat-shielding space 91 on the heat source side with respect to the motor 70 (that is, the position illustrated as the region R3). Thus, heat transferred from the first cover member 81 to the motor 70 through heat conduction can be reduced. Further, heat transferred from the first cover member 81 to the motor 70 through radiant heat transfer can be reduced at the position in the first heat-shielding space 91 on the heat source side with respect to the motor 70. Further, a flow rate of the air flowing at the position in the first heat-shielding space 91 on the heat source side with respect to the motor 70 increases, and thus a rise in temperature of the air at the position is suppressed. Accordingly, the motor 70 can be protected from heat.

Description has been given above of the example in which the first cover member 81 and the second cover member 82 are provided as the cover member that defines the heat-shielding space around the motor 70 being a target component. However, the number of cover members may be one or three or more. Further, description has been given above of the example in which the thickness T1 of the first heat-shielding space 91 becomes maximum at the position on the heat source side with respect to the motor 70. However, when a plurality of heat-shielding spaces are defined, any of the heat-shielding spaces may be the heat-shielding space that has a maximum thickness at the position on the heat source side with respect to the motor 70. For example, the thickness T2 of the second heat-shielding space 92 may become maximum at the position on the heat source side with respect to the motor 70. Further, when a plurality of heat-shielding spaces are defined, the number of heat-shielding spaces, each having a maximum thickness at the position on the heat source side with respect to the motor 70, may be one or plural.

That is, the turbocharger TC includes the target component (the motor 70 in the example described above) and the heat-shielding cover 80 provided between the target component and the heat source. It suffices that the heat-shielding cover 80 include at least one cover member (the first cover member 81 and the second cover member 82 in the example described above) that defines the heat-shielding space around the target component. Further, it suffices that a thickness of at least one heat-shielding space (the first heat-shielding space 91 in the example described above) become maximum at the position on the heat source side with respect to the target component. In this manner, heat transferred from the outside toward the target component through heat conduction and radiant heat transfer can be reduced at the position in the at least one heat-shielding space described above (the region R3 of the first heat-shielding space 91 in the example described above) on the heat source side with respect to the target component. Accordingly, the components of the turbocharger TC can be protected from heat.

In the example described above, in particular, the cover member that defines the heat-shielding space around the target component includes: the first cover member 81 that covers the outer surface of the target component (the motor 70 in the example described above); and the second cover member 82 that covers the outer surface of the first cover member 81. Further, the heat-shielding space includes: the first heat-shielding space 91 defined between the outer surface of the target component and the inner surface of the first cover member 81; and the second heat-shielding space 92 defined between the outer surface of the first cover member 81 and the inner surface of the second cover member 82. In this manner, a double-layered heat-shielding space can be provided for the target component. Thus, a heat-shielding property for the target component is improved. Accordingly, the components of the turbocharger TC can be more effectively protected from heat.

In the example described above, in particular, the first cover member 81 and the second cover member 82 are fixed to each other. As a result, when the first cover member 81 and the second cover member 82, which have been integrated with each other, are mounted to the target component (the motor 70 in the example described above), a double-layered heat-shielding space can be provided for the target component. Meanwhile, when the first cover member 81 and the second cover member 82 are not fixed to each other, it is appropriate to mount the first cover member 81 and the second cover member 82 separately to the target component. Thus, there arise problems such as an increase in the number of components (for example, bolts) for mounting the first cover member 81 and the second cover member 82 to the target component, enlargement of a tool path for a tool used for the components, and an increase in cycle time of assembly work. Thus, the fixing of the first cover member 81 and the second cover member 82 eliminates the problems described above. Further, when the first cover member 81 and the second cover member 82 are fixed to each other, stiffness of the cover members is improved in a synergetic manner.

In the example described above, in particular, the heat-shielding space (the first heat-shielding space 91 and the second heat-shielding space 92 in the example described above) is defined so as to penetrate in the vertical direction. In this manner, when, for example, the turbocharger TC is mounted in a movable object such as a vehicle, a stack effect of a traveling wind flowing in the horizontal direction, which is generated by traveling of the movable object, can induce flow of air in the vertical direction in the heat-shielding space. As a result, stagnation of the air in the heat-shielding space can be suppressed to thereby suppress a rise in temperature of the air in the heat-shielding space. Thus, a heat-shielding property for the target component is improved. Accordingly, the components of the turbocharger TC can be more effectively protected from heat.

Description has been given above with reference to FIG. 3 of one example of distributions of the thickness T1 and the thickness T2. However, the distributions of the thickness T1 and the thickness T2 are not limited to those of the example of FIG. 3. Now, heat-shielding covers 80A, 80B, and 80C in modification examples are described in order with reference to FIG. 4 to FIG. 6. In the modification examples described below, distributions of the thickness T1 and the thickness T2 are different from those of the example of FIG. 3. Otherwise, the modification examples are the same as the example of FIG. 3.

Figure 4:
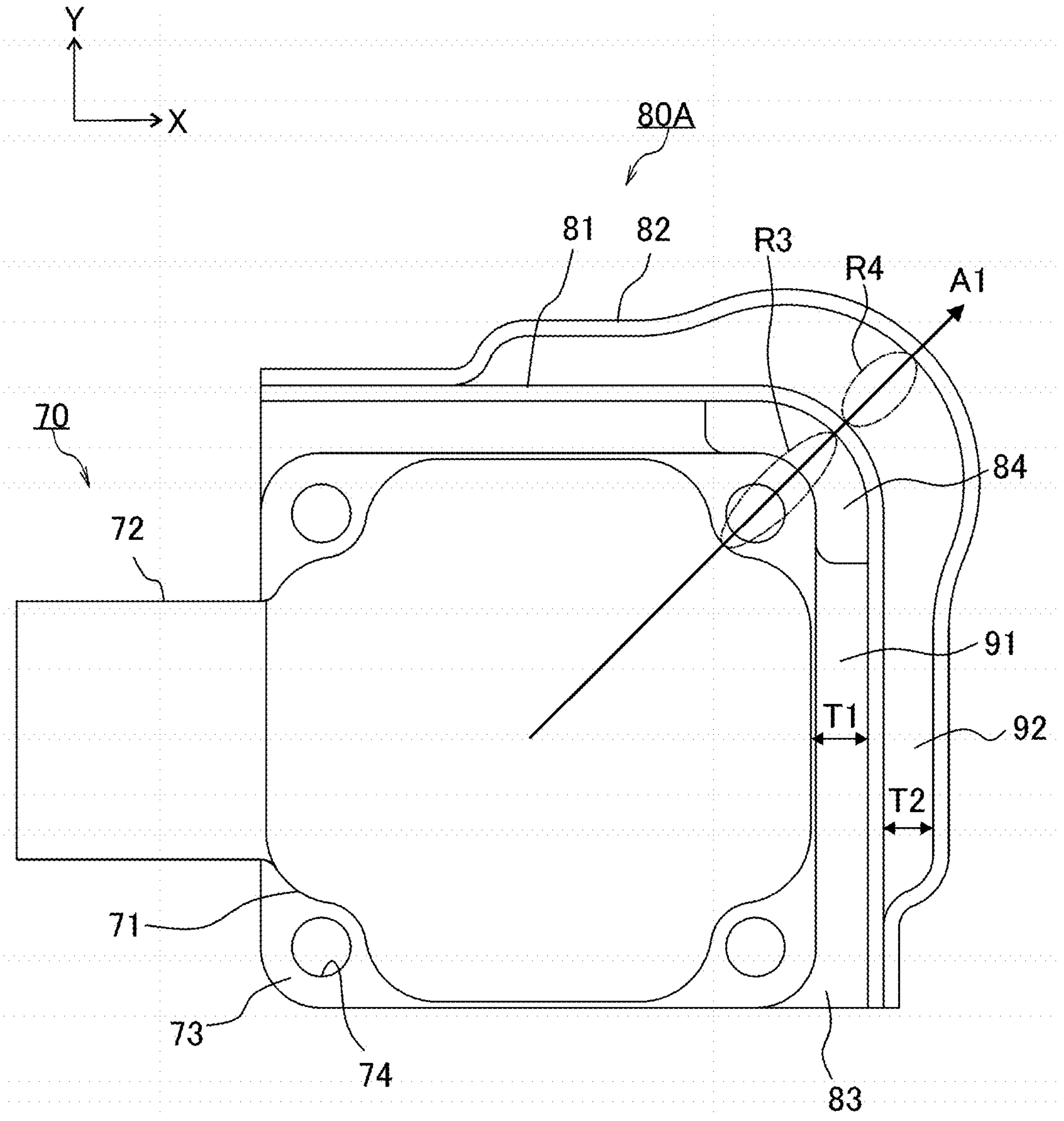
FIG. 4 is a top view for illustrating the motor and a heat-shielding cover in a first modification example.

FIG. 4 is a top view for illustrating the motor 70 and the heat-shielding cover 80A in a first modification example. As illustrated in FIG. 4, in the heat-shielding cover 80A in the first modification example, a shape of a first cover member 81 is the same as that of the above-mentioned example of FIG. 3. Thus, a distribution of a thickness T1 of a first heat-shielding space 91 is the same as that of the above-mentioned example of FIG. 3.

Meanwhile, the heat-shielding cover 80A in the first modification example differs from the heat-shielding cover of the above-mentioned example of FIG. 3 in a shape of a second cover member 82. Specifically, a curved portion (that is, an upper right portion in FIG. 4) in the center of the second cover member 82 of the heat-shielding cover 80A in the circumferential direction protrudes radially outward farther than the curved portion in the above-mentioned example of FIG. 3.

Thus, a thickness T2 of a second heat-shielding space 92 becomes maximum at a position on the heat source side with respect to the motor 70. Specifically, as illustrated in FIG. 4, the thickness T2 of the second heat-shielding space 92 at the position on the heat source side with respect to the motor 70 (that is, the position illustrated as a region R4) is larger than the thickness T2 at positions therearound.

As described above, in the first modification example, the thickness T1 of the first heat-shielding space 91 becomes maximum at the position on the heat source side with respect to the motor 70. As a result, the same effects as those of the above-mentioned example of FIG. 3 are obtained. Further, in the first modification example, the thickness T2 of the second heat-shielding space 92 also becomes maximum at the position on the heat source side with respect to the motor 70. As a result, a layer of air having a low thermal conductivity can be made thick at the position in the second heat-shielding space 92 on the heat source side with respect to the motor 70 (that is, the position illustrated as the region R4). Thus, heat transferred from the second cover member 82 to the first cover member 81 through heat conduction can be reduced. Further, heat transferred from the second cover member 82 to the first cover member 81 through radiant heat transfer can be reduced at the position in the second heat-shielding space 92 on the heat source side with respect to the motor 70. Further, a flow rate of air flowing through the second heat-shielding space 92 at the position on the heat source side with respect to the motor 70 increases, and hence a rise in temperature of the air at the position is suppressed. Accordingly, the motor 70 can be more effectively protected from heat.

Figure 5:
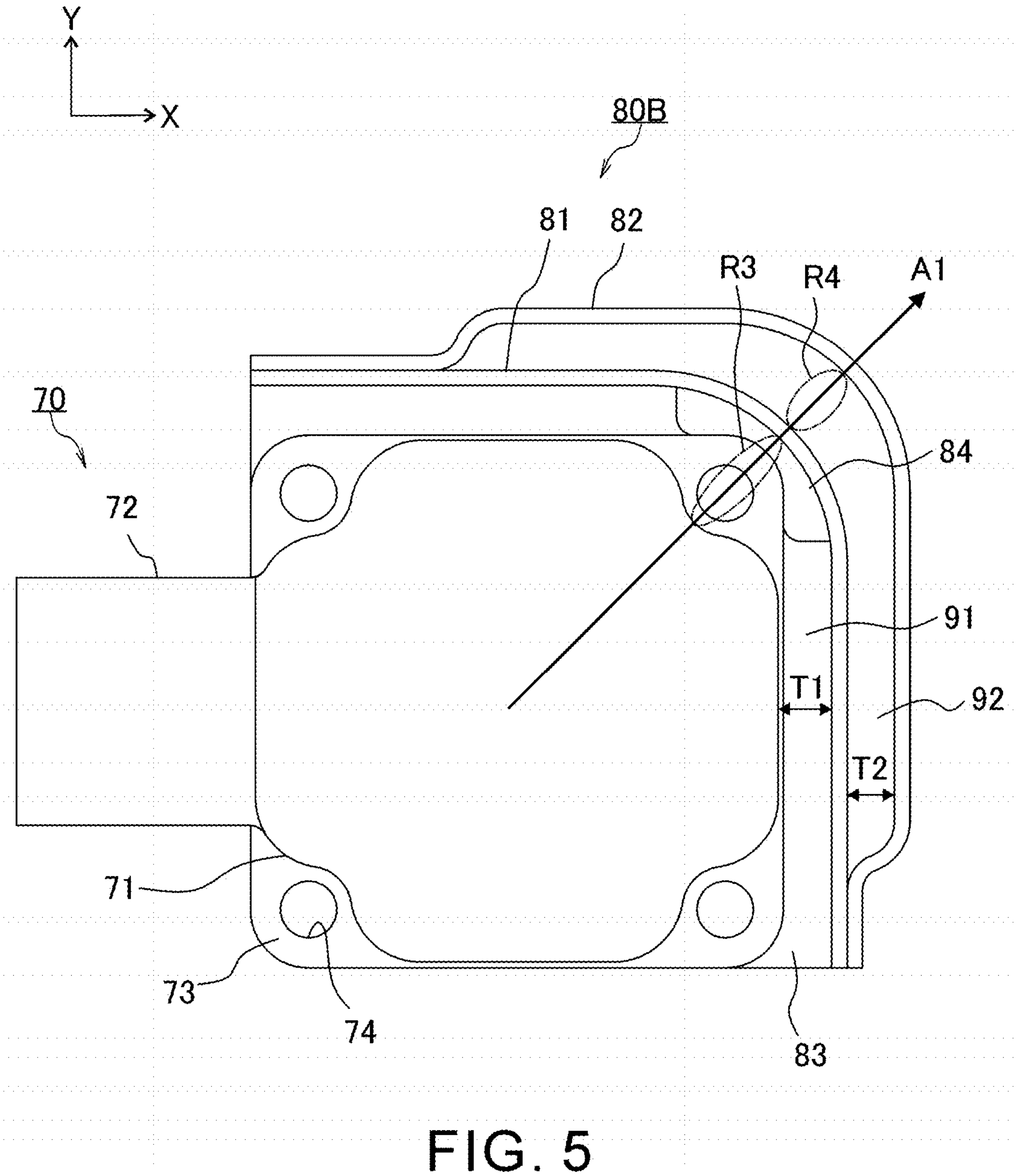
FIG. 5 is a top view for illustrating the motor and a heat-shielding cover in a second modification example.

FIG. 5 is a top view for illustrating the motor 70 and the heat-shielding cover 80B in a second modification example. As illustrated in FIG. 5, in the heat-shielding cover 80B in the second modification example, a shape of a second cover member 82 is the same as that of the above-mentioned example of FIG. 3. Meanwhile, the heat-shielding cover 80B in the second embodiment differs from the heat-shielding cover of the above-mentioned example of FIG. 3 in a shape of a first cover member 81. Specifically, as compared to the first cover member of the above-mentioned example of FIG. 3, a curved portion of the first cover member 81 of the heat-shielding cover 80B in a center in the circumferential direction (that is, an upper right portion in FIG. 5) is closer to the motor 70.

Thus, a thickness T2 of a second heat-shielding space 92 becomes maximum at a position on the heat source side with respect to the motor 70. Specifically, as illustrated in FIG. 5, the thickness T2 at the position in the second heat-shielding space 92 on the heat source side with respect to the motor 70 (that is, the position illustrated as a region R4) is larger than the thickness T2 at positions therearound. Meanwhile, a thickness T1 of a first heat-shielding space 91 becomes maximum at a position on the heat source side with respect to the motor 70 (that is, the position illustrated as a region R3). However, the thickness T1 at the position is smaller than those in the example of FIG. 3 and the example of FIG. 4, which are described above.

As described above, in the second modification example, the thickness T1 of the first heat-shielding space 91 becomes maximum at the position on the heat source side with respect to the motor 70, and the thickness T2 of the second heat-shielding space 92 also becomes maximum at the position on the heat source side with respect to the motor 70. As a result, the same effects as those of the above-mentioned example of FIG. 4 are obtained. However, the thickness T1 of the first heat-shielding space 91 at the position on the heat source side with respect to the motor 70 is shorter than that in the example of FIG. 4, and hence a heat-shielding effect of the first heat-shielding space 91 is reduced.

In the example of FIG. 4 and the example of FIG. 5, which are described above, the thickness T1 of the first heat-shielding space 91 becomes maximum at the position on the heat source side with respect to the motor 70, and the thickness T2 of the second heat-shielding space 92 also becomes maximum at the position on the heat source side with respect to the motor 70. However, while the thickness T2 of the second heat-shielding space 92 becomes maximum at the position on the heat source side with respect to the motor 70, the thickness T1 of the first heat-shielding space 91 may not be maximum at the position on the heat source side with respect to the motor 70. In this case, a heat-shielding effect of the second heat-shielding space 92 enables protection of the motor 70 from heat.

Figure 6:
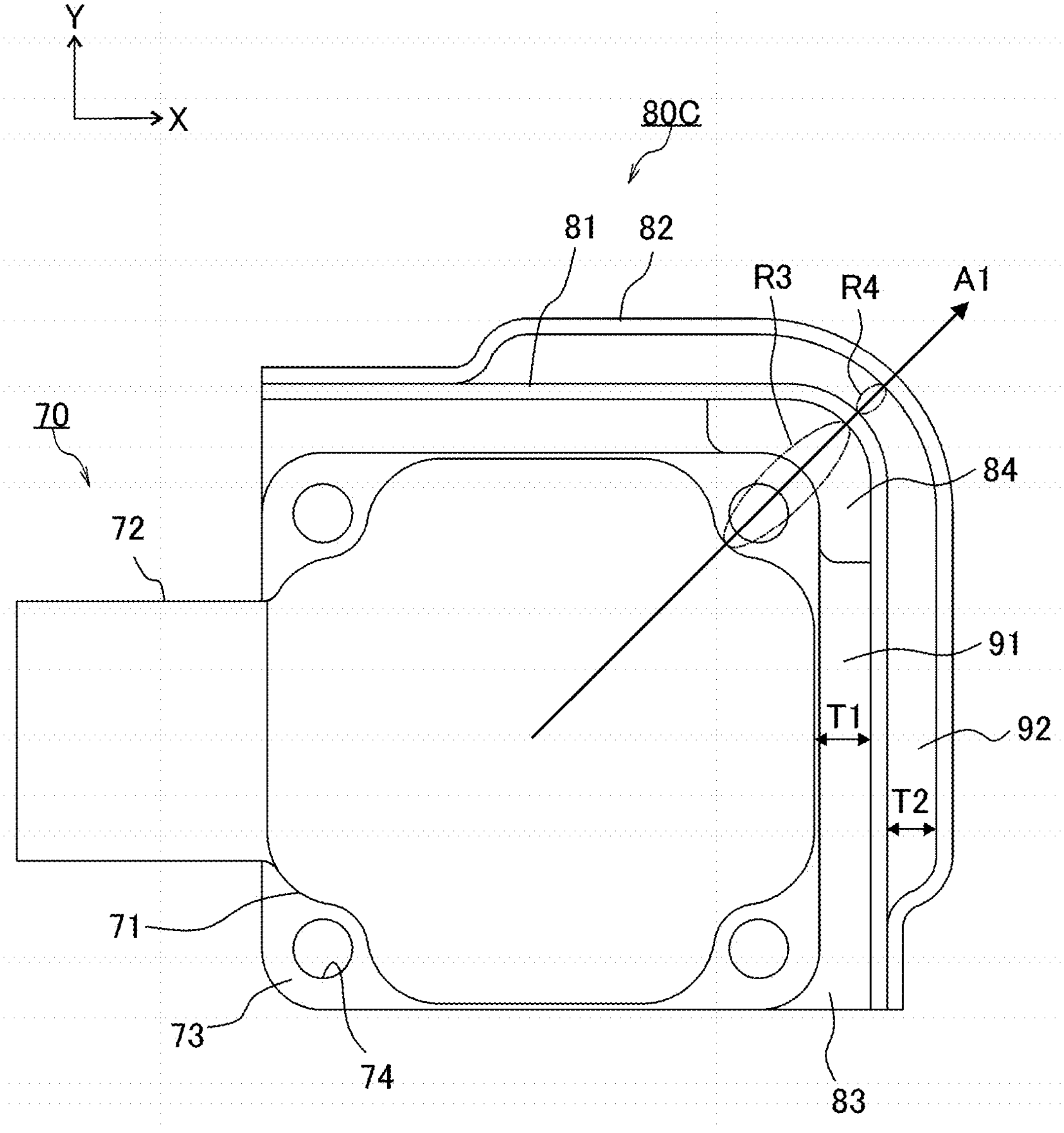
FIG. 6 is a top view for illustrating the motor and a heat-shielding cover in a third modification example.

FIG. 6 is a top view for illustrating the motor 70 and the heat-shielding cover 80C in a third modification example. As illustrated in FIG. 6, in the heat-shielding cover 80C in the third modification example, a shape of a first cover member 81 is the same as that of the above-mentioned example of FIG. 3. Thus, a distribution of the thickness T1 of a first heat-shielding space 91 is the same as that of the above-mentioned example of FIG. 3.

Meanwhile, the heat-shielding cover 80C in the third modification example differs from the heat-shielding cover of the above-mentioned example of FIG. 3 in a shape of a second cover member 82. Specifically, as compared to the above-mentioned example of FIG. 3, a curved portion (that is, an upper right portion in FIG. 6) of the second cover member 82 of the heat-shielding cover 80C in a center in the circumferential direction is closer to the motor 70.

Thus, a thickness T2 of a second heat-shielding space 92 becomes minimum at a position on the heat source side with respect to the motor 70. Specifically, as illustrated in FIG. 6, the thickness T2 of the second heat-shielding space 92 at the position on the heat source side with respect to the motor 70 (that is, the position illustrated as a region R4) is smaller than the thickness T2 at positions therearound.

As described above, in the third modification example, the thickness T1 of the first heat-shielding space 91 becomes maximum at the position on the heat source side with respect to the motor 70. As a result, the same effects as those of the above-mentioned example of FIG. 3 are obtained. However, the thickness T2 of the second heat-shielding space 92 at the position on the heat source side with respect to the motor 70 is smaller than that of the example of FIG. 3. As a result, a heat shielding effect of the second heat-shielding space 92 is reduced.

An embodiment of the present disclosure has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

The present disclosure includes the following configurations.

The turbocharger of the present disclosure is [1] "a turbocharger, including: a target component; and a heat-shielding cover, which is provided between the target component and a heat source, and includes at least one cover member that defines a heat-shielding space around the target component, at least one heat-shielding space having a thickness becoming maximum at a position on the heat source side with respect to the target component."

The turbocharger of the present disclosure may be [2] "the turbocharger according to Item [1], wherein the cover member includes: a first cover member covering an outer surface of the target component; and a second cover member covering an outer surface of the first cover member, and wherein the heat-shielding space includes: a first heat-shielding space defined between the outer surface of the target component and an inner surface of the first cover member; and a second heat-shielding space defined between an outer surface of the first cover member and an inner surface of the second cover member."

The turbocharger of the present disclosure may be [3] "the turbocharger according to Item [2], wherein a thickness of the first heat-shielding space becomes maximum at the position on the heat source side with respect to the target component."

The turbocharger of the present disclosure may be [4] "the turbocharger according to Item [2] or [3], wherein a thickness of the second heat-shielding space becomes maximum at the position on the heat source side with respect to the target component."

The turbocharger of the present disclosure may be [5] "the turbocharger according to any one of Items [2] to [4], wherein the first cover member and the second cover member are fixed to each other."

The turbocharger of the present disclosure may be [6] "the turbocharger according to any one of Items [1] to [5], wherein the heat-shielding space is formed so as to penetrate in a vertical direction."

The invention claimed is:

1. A turbocharger, comprising:

a target component; and a heat-shielding cover, which is provided between the target component and a heat source, and includes at least one cover member that defines a heat-shielding space around the target component, at least one heat-shielding space having a thickness becoming maximum at a position on the heat source side with respect to the target component, wherein the cover member includes: a first cover member covering an outer surface of the target component; and a second cover member covering an outer surface of the first cover member, and wherein the heat-shielding space includes: a first heat-shielding space defined between the outer surface of the target component and an inner surface of the first cover member; and a second heat-shielding space defined between an outer surface of the first cover member and an inner surface of the second cover member.

2. The turbocharger according to claim 1, wherein a thickness of the first heat-shielding space becomes maximum at the position on the heat source side with respect to the target component.

3. The turbocharger according to claim 2, wherein a thickness of the second heat-shielding space becomes maximum at the position on the heat source side with respect to the target component.

4. The turbocharger according to claim 3, wherein the first cover member and the second cover member are fixed to each other.

5. The turbocharger according to claim 4, wherein the heat-shielding space is formed so as to penetrate in a vertical direction.

6. The turbocharger according to claim 3, wherein the heat-shielding space is formed so as to penetrate in a vertical direction.

7. The turbocharger according to claim 2, wherein the first cover member and the second cover member are fixed to each other.

8. The turbocharger according to claim 7, wherein the heat-shielding space is formed so as to penetrate in a vertical direction.

9. The turbocharger according to claim 2, wherein the heat-shielding space is formed so as to penetrate in a vertical direction.

10. The turbocharger according to claim 1, wherein a thickness of the second heat-shielding space becomes maximum at the position on the heat source side with respect to the target component.

11. The turbocharger according to claim 10, wherein the first cover member and the second cover member are fixed to each other.

12. The turbocharger according to claim 11, wherein the heat-shielding space is formed so as to penetrate in a vertical direction.

13. The turbocharger according to claim 10, wherein the heat-shielding space is formed so as to penetrate in a vertical direction.

14. The turbocharger according to claim 1, wherein the first cover member and the second cover member are fixed to each other.

15. The turbocharger according to claim 14, wherein the heat-shielding space is formed so as to penetrate in a vertical direction.

16. The turbocharger according to claim 1, wherein the heat-shielding space is formed so as to penetrate in a vertical direction.

17. The turbocharger according to claim 1, further comprising:

a turbine housing; and a compressor housing, wherein the target component is provided outside the turbine housing and the compressor housing, and wherein the heat source is the turbine housing or an exhaust manifold of an engine is connected to the turbocharger.

18. The turbocharger according to claim 1, wherein the target component is a motor and the heat-shielding space extends around the motor in a circumferential direction of the motor, and wherein the thickness becomes maximum in the circumferential direction at the position on the heat source side with respect to the motor.

* * * * *